(12) United States Patent
Chen et al.

(10) Patent No.: US 9,288,012 B2
(45) Date of Patent: Mar. 15, 2016

(54) HYBRID AUTOMATIC REPEAT REQUEST MANAGEMENT METHOD FOR IMPROVING TRANSMISSION QUALITY

(71) Applicant: MEDIATEK INC., Hsin-Chu (TW)

(72) Inventors: Yu-Ting Chen, Chiayi County (TW); Shu-Huei Yang, New Taipei (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 165 days.

(21) Appl. No.: 14/053,615

(22) Filed: Oct. 15, 2013

(65) Prior Publication Data
US 2015/0106674 A1    Apr. 16, 2015

(51) Int. Cl.
| | |
|---|---|
| H04L 1/18 | (2006.01) |
| H04L 12/801 | (2013.01) |
| H04L 12/851 | (2013.01) |
| H04L 12/863 | (2013.01) |
| H04L 1/20 | (2006.01) |
| H04L 12/54 | (2013.01) |
| H04L 5/00 | (2006.01) |
| H04L 12/833 | (2013.01) |
| H04L 12/855 | (2013.01) |
| H04W 28/10 | (2009.01) |

(52) U.S. Cl.
CPC ............ H04L 1/1825 (2013.01); H04L 1/1812 (2013.01); H04L 1/203 (2013.01); H04L 5/0064 (2013.01); H04L 12/5693 (2013.01); H04L 47/14 (2013.01); H04L 47/2433 (2013.01); H04L 47/2458 (2013.01); H04L 47/2466 (2013.01); H04L 47/626 (2013.01); H04W 28/10 (2013.01)

(58) Field of Classification Search
CPC ..... H04L 1/1825; H04L 1/1812; H04L 47/14; H04L 1/203; H04L 12/5693; H04L 47/2433; H04L 47/2458; H04L 47/2466; H04L 47/626; H04L 5/0064; H04W 28/10
USPC ............ 714/748, 712; 370/252, 394; 455/509
See application file for complete search history.

(56) References Cited

U.S. PATENT DOCUMENTS

| | | | | |
|---|---|---|---|---|
| 8,644,217 | B2* | 2/2014 | Skarve et al. | 370/328 |
| 2006/0072503 | A1* | 4/2006 | Kim et al. | 370/329 |
| 2006/0146761 | A1* | 7/2006 | Kim et al. | 370/335 |
| 2006/0251079 | A1* | 11/2006 | Kwak et al. | 370/394 |
| 2007/0025264 | A1* | 2/2007 | Cheng et al. | 370/252 |
| 2008/0305819 | A1* | 12/2008 | Chun et al. | 455/509 |
| 2010/0041430 | A1* | 2/2010 | Ishii et al. | 455/522 |
| 2011/0026408 | A1* | 2/2011 | Skarve et al. | 370/242 |
| 2012/0020310 | A1* | 1/2012 | Ji et al. | 370/329 |

* cited by examiner

Primary Examiner — John J Tabone, Jr.
(74) Attorney, Agent, or Firm — Winston Hsu; Scott Margo (57) ABSTRACT

The present invention to provide methods and related controllers that manage HARQ processes in a wireless communications system. The present invention provides a method and related controller to map data units (e.g. PDU) of importance that is to be transmitted to a HARQ process having a higher transmission success rate to prevent the data units from being transmitted via a HARQ process having more transmission failures. In addition, the present invention also provides a method and a related controller to force a HARQ process to retransmit a data unit that has been correctly received by a receiving end to reduce the latency of retransmission caused by a possible transmission failure occurring between a MAC layer and a RLC layer at the receiving end.

16 Claims, 10 Drawing Sheets

FIG. 1 RELATED ART

| HARQ ID | 0 | 1 | 2 | 3 | 4 | 5 | 6 | 7 |
|---|---|---|---|---|---|---|---|---|
| PDU Transmission Count | 47 | 17 | 17 | 20 | 10 | 12 | 15 | 12 |
| Retransmission Count | 0 | 40 | 25 | 42 | 15 | 27 | 34 | 33 |
| Avg Retransmission Count | 0 | 2.35 | 1.47 | 2.10 | 1.50 | 2.25 | 2.27 | 2.75 |

HYBRID AUTOMATIC REPEAT REQUEST MANAGEMENT METHOD FOR IMPROVING TRANSMISSION QUALITY

BACKGROUND

The present invention relates to wireless communications, and more particularly, to methods and controllers that manage Hybrid Automatic Repeat reQuest (HARQ) processes to handle transmission errors regarding the HARQ transmission.

Figure 1:
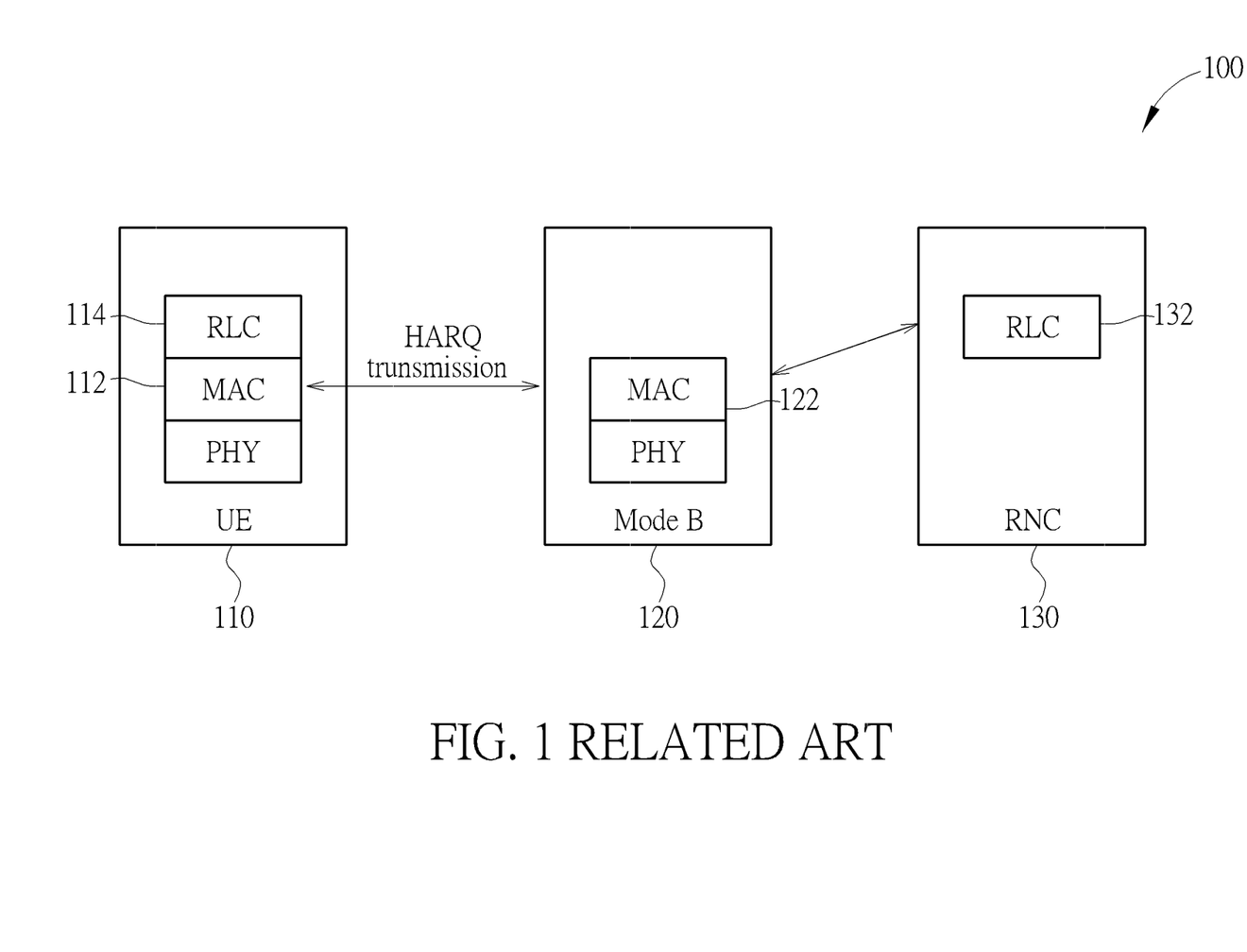
FIG. 1 is a schematic diagram of a wireless communications system.

To improve the reliability of data transmission, HARQ scheme that is a combination of Forward Error Correction (FEC) and Automatic Repeat-reQuest (ARQ) is added to packet data transmission systems. In HARQ scheme, error correction codes sent by a transmitting end can be used to detect errors as well as correct errors. After a receiving end receives packets and error correction codes, if an error exists and is correctable with respect to error correction codes sent by the transmitting end, the error will automatically be corrected; otherwise, the receiving end will send corresponding feedback signals to the transmitting end, asking for a retransmission. Please refer to FIG. 1 illustrating an example of a conventional wireless communications system 100 including HARQ scheme conforming to wideband code division multiple access (W-CDMA) standard. The wireless communications system 100 includes a user equipment (UE) 110, a Node B 120 and a radio network controller (RNC) 130. In this system, a protocol data unit (PDU) in an uplink scenario is sent from a transmitting end comprising the user equipment 110 to a receiving end comprising the Node B 120 and the RNC 130. In a downlink scenario, the transmitting end comprises the Node B 120 and the RNC 130, sending the PDU to the UE 110. For transmission on a medium access control (MAC) layer of the wireless communications system 100, the MAC PDU fails to be received could be retransmitted with a HARQ process.

HARQ entities are located in a medium access control (MAC) layer 112 of the UE 110 as well as a MAC layer 122 of the Node B 120. The HARQ entity of the UE 110 can include eight HARQ processes, wherein different HARQ processes are identified by process IDs. The HARQ entity of the UE 110 and the HARQ entity in Node B 120 are peer entities, including the same number of HARQ processes; each HARQ process forms the one-to-one protocol entity through the process ID. The HARQ process on the Node B 120 receives the MAC PDU sent by the HARQ process on the UE 110. Unfortunately, there are problems that are related to transmission failures regarding the HARQ scheme, which significantly affects the performance of the wireless communications system 100.

Figure 2:
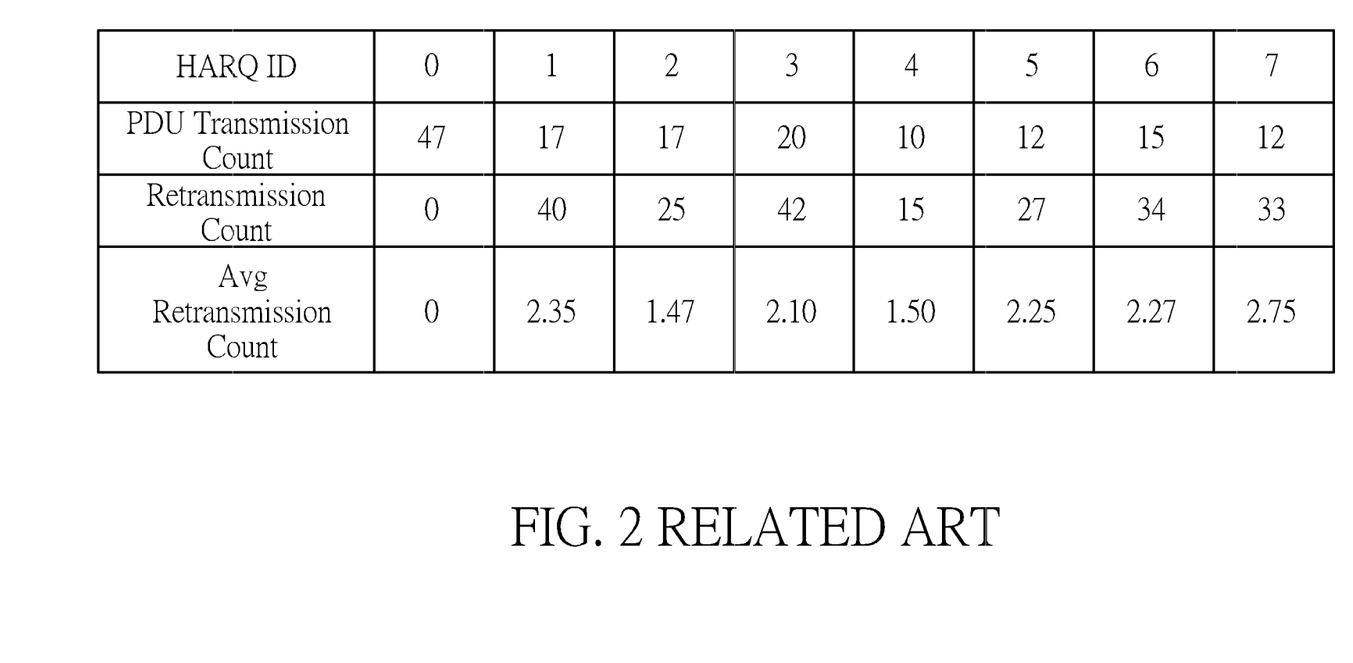
FIG. 2 illustrates an imbalance between occurrences of HARQ transmission failure on different HARQ processes.

Problem I:

In certain conditions, HARQ transmission failure may occur in some HARQ processes more frequently than in other HARQ processes. This imbalance between occurrences of HARQ transmission failures on different HARQ processes leads to certain problems when some important data are sent via these HARQ processes. Please refer to FIG. 2, which illustrates the imbalance between occurrences of the HARQ transmission failures on the HARQ processes. In the table shown in FIG. 2, the "Avg. retransmission count" means how many times of retransmissions are required by a HARQ process to successfully transmit a PDU. In the condition represented by the table, HARQ process 1 and HARQ process 7 require considerably more retransmissions for successfully transmitting a PDU while HARQ processes 0, 2 and 4 require relatively fewer retransmissions for successfully transmitting a PDU. That is, HARQ transmission failure occurs more frequently in HARQ process 1 and HARQ process 7 than in other HARQ processes. If a control PDU or a retransmission PDU from an upper layer (e.g. RLC layer) is mapped to and transmitted via HARQ process 1 and HARQ process 7, the latency of the wireless communications system 100 will be deteriorated.

Problem II:

When a MAC PDU is correctly received by a HARQ process of the MAC layer 122 of the Node B 120 (the receiving end), the HARQ process of the MAC layer 122 of the Node B 120 sends a positive acknowledgment (ACK) response back to a corresponding HARQ process of the MAC layer 112 of the UE 110. The correctly received MAC PDU will further sent from the MAC layer 122 of the Node B 120 to a radio link (RLC) layer 132 of the radio network controller (RNC) 130 in the wireless communications system 100.

However, the radio link control (RLC) layer 132 of the RNC 130 may fail to correctly receive the MAC PDU sent by the MAC layer 122 of the Node B 120. Alternatively, the RLC layer 132 of the RNC 130 may lose RLC packets due to loading issues even if the RLC packets have been correctly received by Node B 120.

Once the above conditions occur, the RLC layer 132 of the RNC 130 signals the RLC layer 114 of the UE 110 with a negative acknowledgment (NACK) response. This may be caused by poor network status between the Node B 120 and RNC 130. Such transmission failure is referred to as HARQ ACK-to-RLC NACK error, which further gives rise to RLC retransmission between the UE 110 and Node B 120. As it takes pretty long time to request the RLC layer 114 of the UE 110 to retransmit RLC PDU, this severely reduces the performance of the wireless communications system 100.

SUMMARY

In order to address the above-mentioned problems, it is one of objectives of the present invention to provide methods and related controllers that manage HARQ processes in a wireless communications system. To address problem I, the present invention provides a method and related controller to map data units (e.g. PDU) of importance that is to be transmitted to a HARQ process having a higher transmission success rate to prevent the data units from being transmitted via a HARQ process having more transmission failures. In addition, to address problem II, the present invention provides a method and a related controller to force a HARQ process to retransmit a data unit that has been acknowledged by a receiving end to reduce the latency of the retransmission caused by a possible transmission failure occurring between the MAC layer and a RLC layer at the receiving end.

According to one embodiment of the present invention, a method of managing at least one Hybrid Automatic Repeat reQuest (HARQ) process in a wireless communications system is provided. The method comprises: determining a priority of the HARQ process according to a transmission success rate of the HARQ process; determining a priority of a data unit to be transmitted; and transmitting the data unit according to the priority of the data unit and the priority of the HARQ process.

According to one embodiment of the present invention, a method of managing at least one HARQ process in a wireless communications system is provided. The method comprises: determining whether a number of HARQ acknowledgement (ACK)-to-Radio Link Control (RLC) negative acknowledgement (NACK) errors occurred on the HARQ process reaches a threshold; and when the number of the HARQ ACK-to-RLC NACK errors occurred on the HARQ process reaches the threshold, configuring the HARQ process to perform at least one retransmission of a data unit even if a HARQ ACK corresponding to the data unit has been received.

According to one embodiment of the present invention, a controller of managing at least one HARQ process in a wireless communications system is provided. The controller comprises: a first determination module, a second determination module and a configuration module. The first determination module is arranged to determine a priority of the HARQ process according to a transmission success rate of the HARQ process. The second determination module is arranged to determine a priority of a data unit to be transmitted. The configuration module is coupled to a first determination module and the second determination module, and arranged to transmit the data unit according to the priority of the data unit and the priority of the HARQ process.

According to one embodiment of the present invention, a controller of managing at least one HARQ process in a wireless communications system is provided. The controller comprises a determination module and a configuration module. The determination module is arranged to determine whether a number of HARQ acknowledgement (ACK)-to-Radio Link Control (RLC) negative acknowledgement (NACK) errors occurred on the HARQ process reaches a threshold. The configuration module is coupled to the determination module, when the number of the HARQ ACK-to-RLC NACK errors occurred on the HARQ process reaching the threshold, arranged to configure the HARQ process to perform at least one retransmission of a data unit even if a HARQ ACK corresponding to the data unit has been received.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following descriptions and claims to refer to particular system components. As one skilled in the art will appreciate, manufacturers may refer to a component by different names. This document does not intend to distinguish between components that differ in name but not differ in functionality. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections.

Reference in the specification to "one embodiment" means that a particular feature, structure, or characteristic described in connection with the embodiment is included in at least an implementation. The appearances of the phrase "in one embodiment" in various places in the specification are not necessarily all referring to the same embodiment. Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

Figure 3:
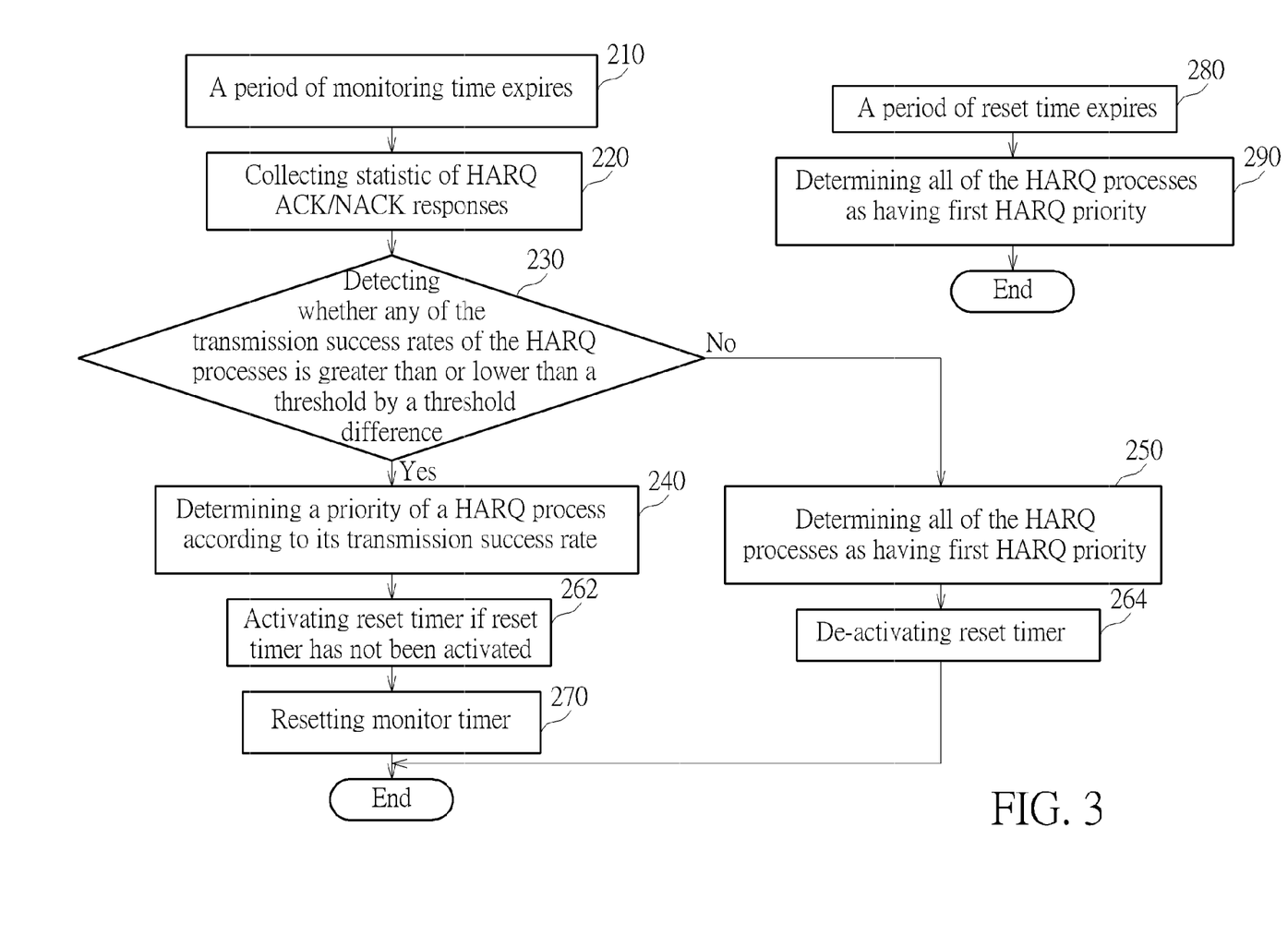
FIG. 3 is a flow chart of a monitoring process I of a method according to one exemplary embodiment of the present invention.
Figure 4:
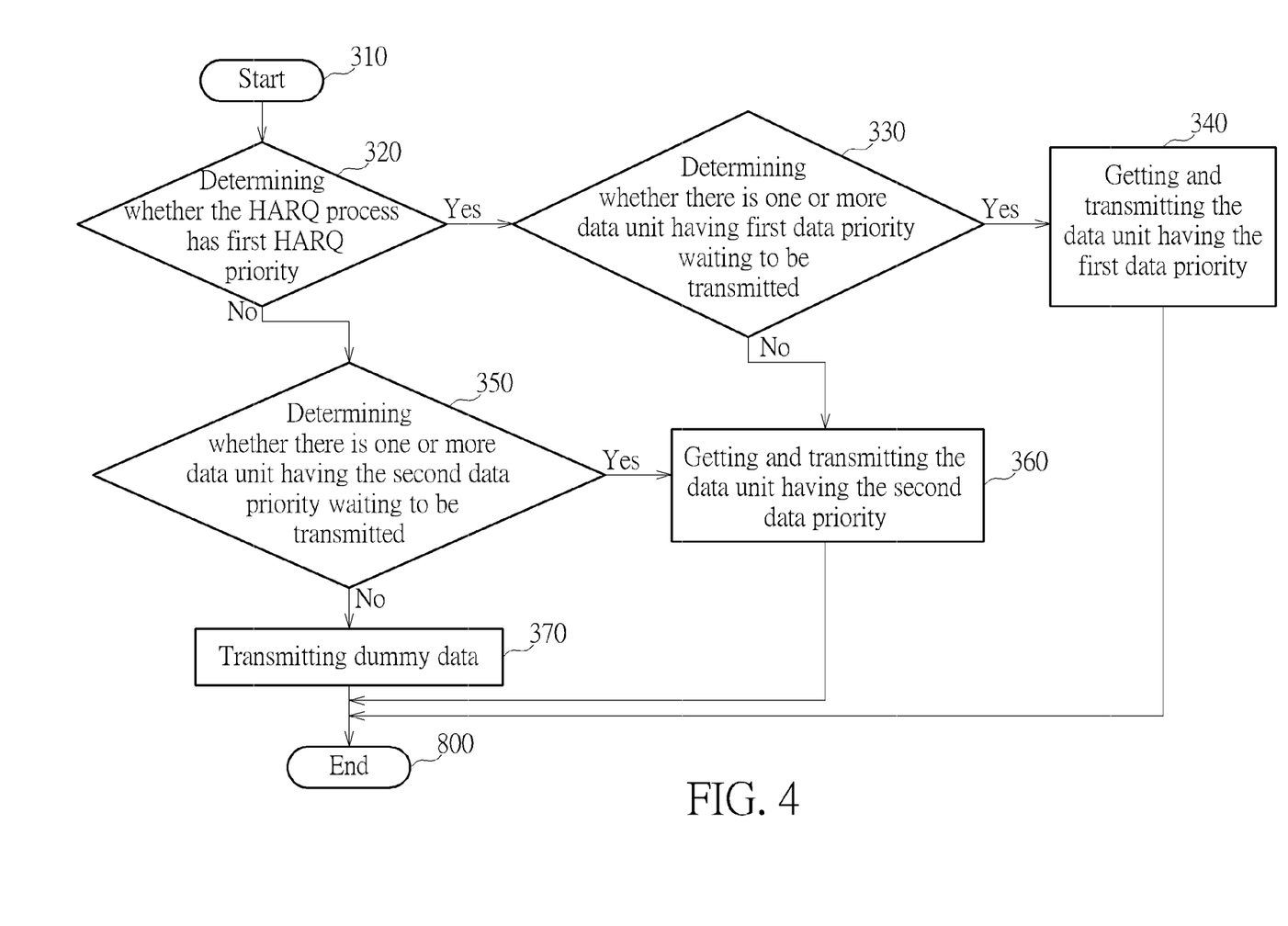
FIG. 4 is a flow chart of a handling process I of a method according to one exemplary embodiment of the present invention.

According to one embodiment of the present invention, a method for managing HARQ processes to address the above-mentioned problem I that the occurrences of HARQ transmission failures on the different HARQ processes in a wireless communications system are imbalanced is illustrated in FIG. 3 and FIG. 4. FIG. 3 exemplarily illustrates a monitoring process I of the method while FIG. 4 exemplarily illustrates a handling process I of the method.

Please refer to a flow chart of the monitoring data unit process I depicted in FIG. 3. The monitoring process I is intended for detecting whether or not there is an imbalance between the occurrences of HARQ transmission failures on the different HARQ processes at a transmitting end. At first, step 210 recognizes that a period of monitoring time (counted by a monitor timer) has expired to start the flow. According to various embodiments of the present invention, the monitor timer could be a traditional timer or implemented with a PDU counter that represents how many PDUs are transmitted from a MAC layer at the transmitting end (e.g. UE) in the wireless communications system or a transmission time interval (TTI) counter that represents duration of transmission on the radio link of the transmitting end. When the PDU/TTI counter counts to a predefined value, it represents that the period of monitoring time expires and then the flow goes to step 220. In step 220, statistics of HARQACK/NACK responses corresponding to each HARQ process is collected, including numbers of HARQ ACK/NACK responses that has been received at the transmitting end during the monitoring time. As a result, a transmission success rate of the HARQ process can be determined. The transmission success rate of the HARQ process could be calculated according to a ratio of the number of HARQ ACK responses to the number of a summation of HARQ ACK and NACK responses that are received.

When the flow enters step 230, it is detected whether any of the transmission success rates of the HARQ processes of the transmitting end is greater than or lower than a threshold by a threshold difference. If yes, it can be recognized that the transmission success rates of HARQ processes of the UE are quite different, meaning that there could be the imbalance between the occurrences of HARQ transmission failures. Therefore, the flow goes to step 240. If none of the transmission success rates is greater than or lower than the threshold by the threshold difference, meaning that the occurrences of HARQ transmission failures on the different HARQ processes is uniform, the flow goes to step 250. According to various embodiments of the present invention, the threshold may be predetermined as a fixed value or dynamically adjusted during data transmission. For example, the threshold could be derived by experimental data in advance. Alternatively, an average value of transmission success rates of all the HARQ processes of the transmitting end could be the threshold. In this way, the average value varies with the transmission success rates of all the HARQ processes collected during the monitoring time. Due to changes to the network status, the average value may change as well. Also, the threshold difference could be fixed or adjustable during the data transmission. The threshold difference is used to determine what transmission success rate will be considered as too low or too high to cause the imbalance.

When the flow goes to step 240, according to the transmission success rate, the HARQ process is determined as having either a first HARQ priority or a second HARQ priority, wherein the first HARQ priority is higher than the second HARQ priority. In one embodiment, the threshold is also used to determine the priority of the HARQ process. If the HARQ process has the transmission success rate greater than the threshold, the HARQ process is determined as having the first HARQ priority. If the HARQ process has the transmission success rate lower than the threshold, the HARQ process is determined as having the second HARQ priority.

When none of the HARQ processes has the transmission success rate is greater than or lower than the threshold by the threshold difference, the flow goes to step 250. In step 250, all of the HARQ processes are determined as having a same HARQ priority (e.g. first HARQ priority). The priority of the HARQ process will determine what type of data unit (e.g. PDU) can be transmitted via this HARQ process. The HARQ process having relatively lower priority is not allowed to transmit data units of importance.

According to one embodiment of the present invention, the flow may go to step 262 if reset timer has not been activated before going to step 270, in which a reset timer will be activated to count a period of reset time. This is intended for avoiding the unfavorable influence on the data transmission due to the misjudgment on the priority of the HARQ process. Also, this is intended for correctly reflecting the network status. This is because when the network status changes, the imbalance between the occurrences of HARQ transmission failures may not exist anymore. At this time, this is not necessary to prioritize the HARQ process. When the period of reset time expires (step 280), all of the HARQ processes will be determined to have the first HARQ priority (step 290). In other words, none of the HARQ process will be inhibited to transmit data units of importance. Also, the collected statistics of the number of HARQ ACK/NACK responses will be cleared when the reset timer expires. Furthermore, in this embodiment, when the flow goes to step 250 and all of the HARQ processes are determined having the same HARQ priority, the reset timer will be de-activated (step 264). By virtue of the reset timer, it can be avoided that the HARQ process is determined having an improper priority for too long.

After the monitor process I illustrated in FIG. 3 is finished, the method performs the handling process I to determine how to map data units having different priority to HARQ processes at the transmitting end. A flow of the handling process I is illustrated in FIG. 4. In step 310, the HARQ process attempts to get a data unit from an upper layer (e.g. RLC layer) at the transmitting end. Then, the flow goes to step 320, it is determined whether the HARQ process has the first HARQ priority. If yes, the flow goes to step 330, it is determined whether there is one or more data unit having a first data priority (higher priority) waiting to be transmitted. In one embodiment, the data unit corresponding to control data or retransmission data will be determined as having the first data priority. On other hand, the data unit corresponds to other types of data will be determined as having a second data priority that is lower than the first data priority. If the result of step 330 is yes, the flow goes to step 340, the HARQ process having the first HARQ priority gets and transmits the data unit having the first data priority. If the result of step 330 is no, the flow goes to step 360, the HARQ process having the first HARQ priority gets and transmits the data unit having the second data priority (if exists).

Moreover, if it is determined in step 320 that the HARQ process has the second HARQ priority (lower priority), the flow will go to step 350, determining whether there is one or more data unit having the second data priority waiting to be transmitted. If yes, the HARQ process having the second HARQ priority gets and transmits the data unit having the second data priority (step 360). If there is no data unit having the second data priority waiting to be transmitted, the flow goes to step 370, transmitting dummy data via the HARQ process having the second HARQ priority. This is intended for keeping the collection of the statistics of HAQK ACK/NACK responses in order for updating the priority of the HARQ process when a next period of monitoring time expires. By doing so, the monitoring process I can properly reflect the changing of the network status. In one embodiment, if an amount of the data units having the first data priority waiting to be transmitted reaches an upper limit, step 370 may allow the HARQ process having the second priority to transmit the data unit having the first data priority.

Figure 5:
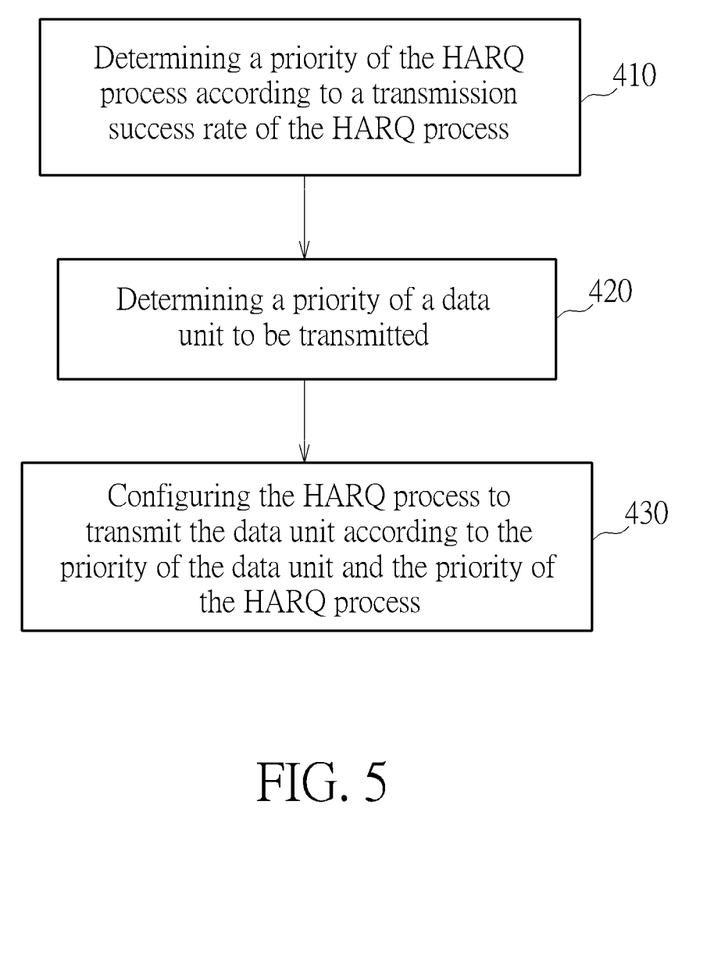
FIG. 5 is a simplified flow chart of the monitoring process I and the handling process I of a method according to one exemplary embodiment of the present invention.

FIG. 5 illustrates a simplified flow chart including the monitoring process I and handling process I according to one embodiment of the present invention. The flow includes step 410-430. In step 410, it is determined a priority of the HARQ process according to a transmission success rate of the HARQ process. Preferably, the priority of the HARQ process is selected from at least a group consisting of a first HARQ priority and a second HARQ priority lower than the first HARQ priority. In step 420, it is determined a priority of a data unit to be transmitted. Preferably, the priority of the data unit is selected from at least a group consisting of a first data priority and a second data priority lower than the first data priority. In step 430, the HARQ process transmits the data unit according to the priority of the data unit and the priority of the HARQ process. As principles and operations of the method of FIG. 5 can be appreciated by the above embodiments, detailed descriptions of the method of FIG. 5 are omitted here for the sake of brevity.

Figure 6:
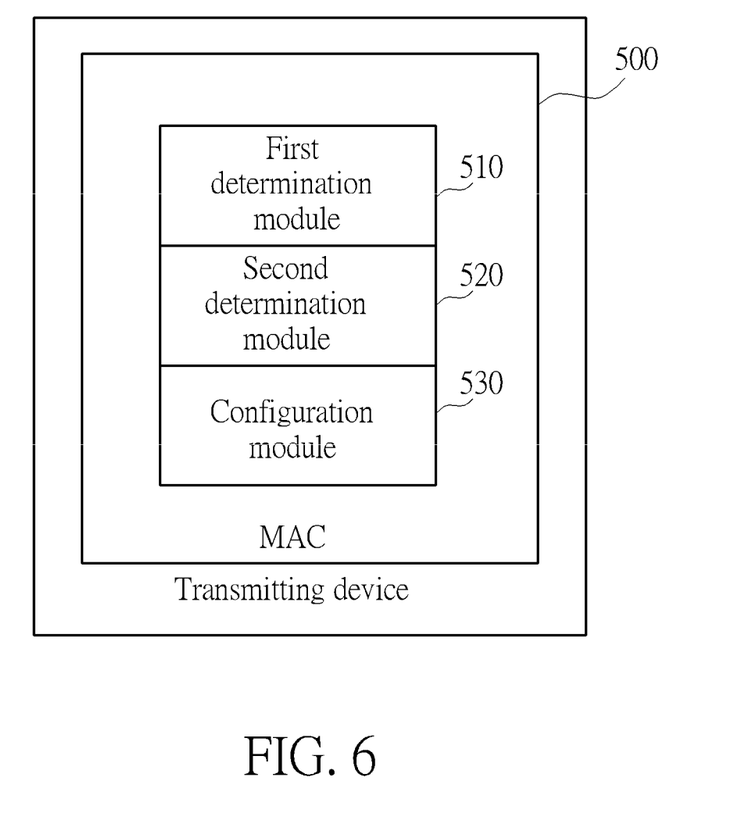
FIG. 6 is a functional block diagram of a controller implementing the method of FIG. 5 according to one exemplary embodiment of the present invention.

According to one embodiment of the present invention, a controller for implementing the above-mentioned method of addressing the imbalance between occurrences of HARQ transmission failures on different HARQ processes is provided. FIG. 6 illustrates a block diagram of the controller. As illustrated, the controller 500 is located in a MAC layer of a transmitting device for managing the HARQ processes included in the MAC layer. The controller 500 includes a first determination module 510, a second determination module 520 and a configuration module 530. The first determination module 510 determines a priority of the HARQ process according to a transmission success rate of the HARQ process, wherein first determination module 510 further determines the transmission success rate of the HARQ process according to HARQ ACK/NACK responses sent by a receiving device coupled to the transmitting device via a wireless connection. Once the first determination module 510 recognizes that any of the transmission success rates of the HARQ processes significantly deviates from the transmission success rates of other HARQ processes, the first determination module 510 prioritizes the HARQ processes with a higher or lower HARQ priority. The second determination module 520 determines a priority of a data unit (e.g. PDU) to be transmitted. The data unit could be derived from a RLC layer of the transmitting device. When the data unit corresponds to control data or retransmission data, the data unit is determined as having a higher priority. The configuration module 530 is coupled to the first determination module 510 and a second determination module 520, and configures the HARQ process to transmit the data unit waiting to be transmitted according to the priority of the data unit and the priority of the HARQ process. As principles and operations of the controller of FIG. 6 can be appreciated by the above embodiments, detailed descriptions of the controller of FIG. 6 are omitted here for the sake of brevity.

Figure 7:
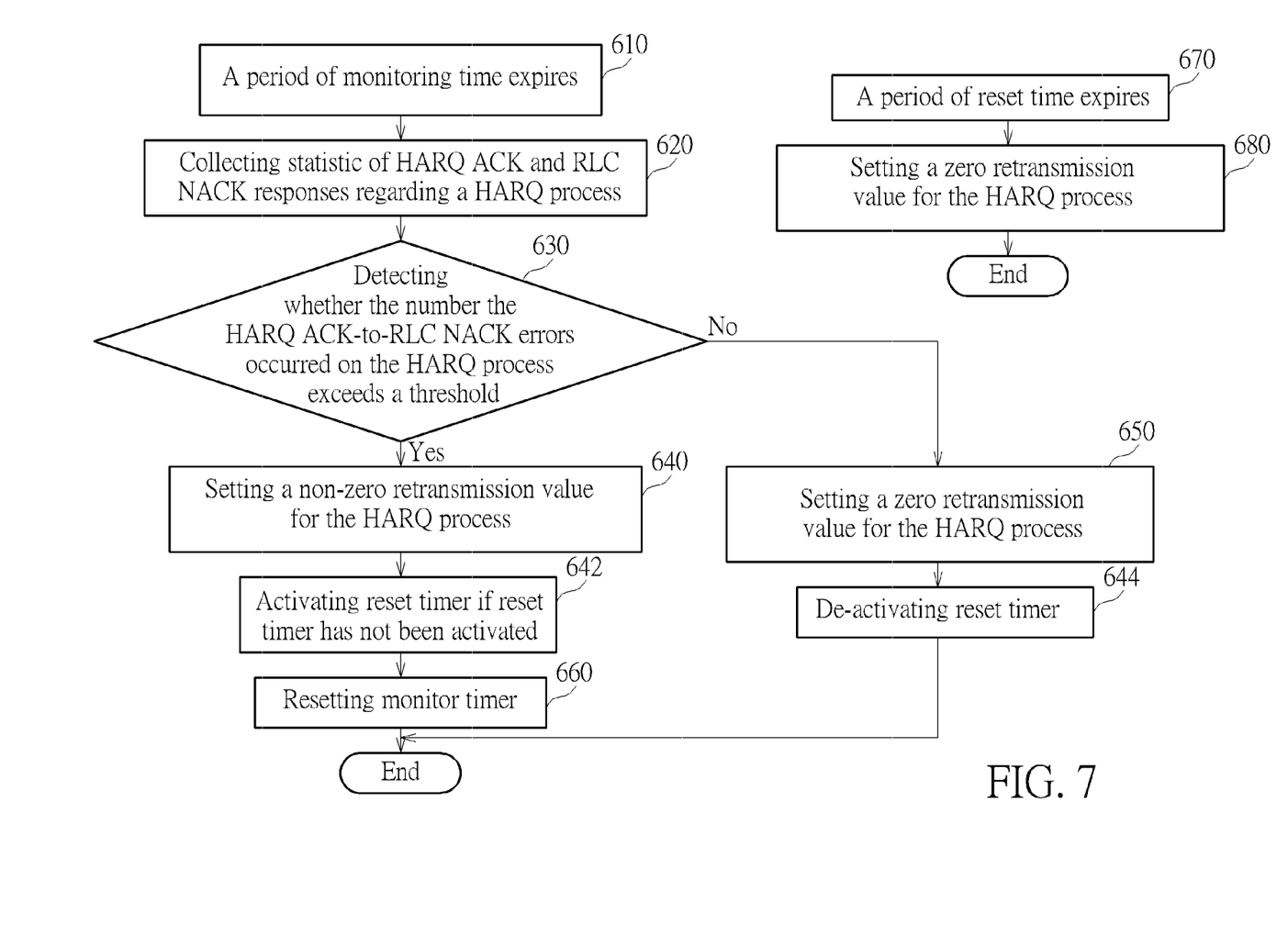
FIG. 7 is a flow chart of a monitoring process II of a method according to one exemplary embodiment of the present invention.
Figure 8:
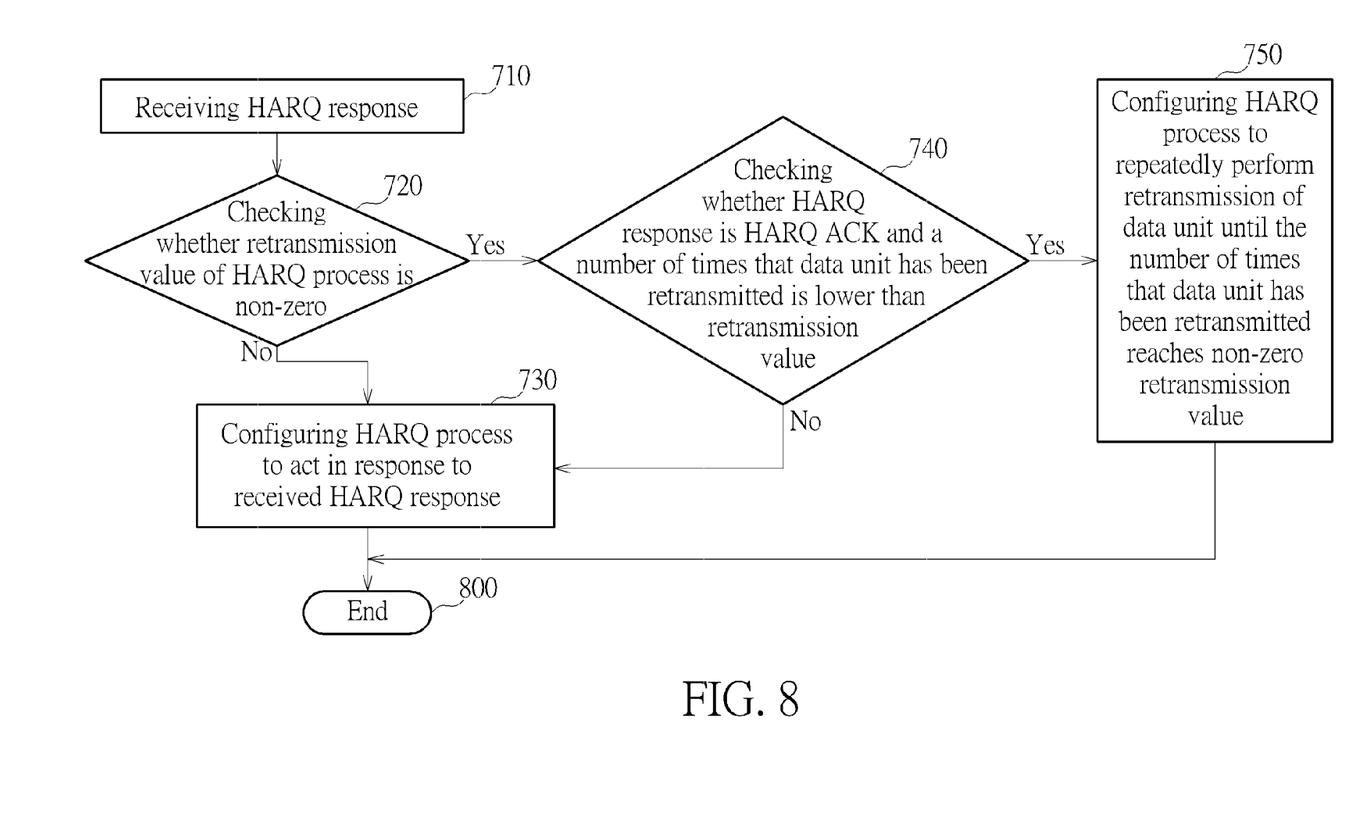
FIG. 8 is a flow chart of a handling process II of a method according to one exemplary embodiment of the present invention.

According to one embodiment of the present invention, a method for addressing the above-mentioned problem II that the HARQ process has overmany HARQ ACK-to-RLC NACK errors is provided. The method includes monitoring process II and handling process II as respectively depicted in FIG. 7 and FIG. 8. Please refer to FIG. 7 illustrating a flow chart of the monitoring process II according to one embodiment of the preset invention. The monitoring process II is intended for checking whether there exists any of HARQ processes at a transmitting end having the HARQ ACK-to-RLC NACK errors more than other HARQ processes do at the transmitting end.

At first, step 610 recognizes that a period of monitoring time (by a monitor timer) expires to start the flow. According to various embodiments of the present invention, step 610 could be a traditional timer or implemented with a PDU counter or a TTI counter as mentioned above. When the PDU/TTI counter counts to a predefined value, it can be recognized that the period of monitoring time expires and the flow goes to step 620. Please note that the period of monitoring time here may not be identical in length to the period of monitoring time in the monitoring process I. In step 620, for a HARQ process at the transmitting end, collecting statistics of received HARQ responses corresponding to the data units that are transmitted by the HARQ process and correctly received by the receiving end. Also, statistics of RLC responses corresponding to the above-mentioned data units after the data units are sent to a RLC layer at the receiving end, including at least numbers of HARQ ACK responses and RLC NACK response corresponding to same data units. As a consequence, a number of the HARQ ACK-to-RLC NACK errors occurred on the HARQ process can be derived. Then, in step 630, it is detected whether the number the HARQ ACK-to-RLC NACK errors occurred on the HARQ process exceeds a threshold (different from the threshold in monitoring process I). If yes, the flow goes to step 640; otherwise, the flow goes to step 650. When the flow goes to step 640, the flow sets a non-zero retransmission value for the HARQ process, meaning that the HARQ process have overmany HARQ ACK-to-RLC NACK errors. HARQ ACK-to-RLC NACK errors may be caused by loading issues between the RNC and the Node B. The loading issues will let the RLC layer of the RNC lose RLC packets even if the MAC layer of the Node B has been successfully received the RLC packets. Once such error occurs, it will subsequently lead to a high latency of RLC retransmission between the RLC layer of the transmitting end (e.g. UE) and the receiving end (e.g. RNC). Hence, the present invention forces the HARQ process to retransmit the data unit that has been correctly received by the MAC layer of the receiving end. The HARQ process directly retransmits the data unit without waiting for any RLC layer response from the receiving end.

On other hand, when the flow goes to step 650, this means that it is unnecessary to force the HARQ process to retransmit the data unit that has been correctly received by the receiving end. In this way, the HARQ process at the transmitting end does not need to perform retransmission unless a HARQ discontinuous transmission (DTX) or NACK response is received.

According to various embodiment of the present invention, the threshold may be predetermined as a fixed value or dynamically adjusted during data transmission. For example, the threshold could be derived by experimental data in advance. Alternatively, an average value of the numbers of HARQ ACK-to-RLC NACK errors of all the HARQ processes at the transmitting end could be the threshold. In this way, the average value varies with the numbers of HARQ ACK-to-RLC NACK errors of all the HARQ processes collected during the period of the monitoring time.

After steps 640/650, the flow may go to step 660, the PDU counter/TTI counter/timer is reset to count a next period of monitoring time. Similar to monitoring process I, the flow of the monitoring process II may include reset steps. When the flow goes to step 642, a reset timer will be activated to count a period of reset time. This is intended for allowing the HARQ process to leave the mandatory retransmission state. When the period of reset time expires (step 670), the HARQ process will be configured to have a zero retransmission value to leave the mandatory retransmission state (step 680). The statistics of HARQ responses and RLC responses collected in step 620 will be cleared when the reset timer expires.

Further, when the flow goes to step 650 and the HARQ process does not enter the mandatory retransmission state, the reset timer will be de-activated (step 644). By virtue of the reset timer, it can be avoided that the HARQ process improperly enters the mandatory retransmission state or the HARQ process stays in the mandatory retransmission state for too long. This is because unnecessary retransmission will make the performance of the wireless communications system become worse.

After the monitoring process II is finished, the HARQ process will have either a zero retransmission value or a non-zero retransmission value. Accordingly, the handling process II is used to configure the HARQ process according to the retransmission value. Please refer to a flow chart of the handling process II depicted in FIG. 8 according to one embodiment of the preset invention. At first, after the HARQ process at the transmitting end receives a response (ACK/NACK/DTX) of a data unit that has been sent to the receiving end, the flow goes to step 720, checking whether the retransmission value of the HARQ process is non-zero. If the retransmission value is zero, the flow goes to step 730, configuring the HARQ process to act in response to the HARQ response sent by the receiving end. For example, if the response is an HARQ ACK, the HARQ process transmits another data unit waiting to be transmitted. If the response is a HARQ NACK or HARQ DTX, the HARQ process retransmits the data unit. The flow goes to step 740 when the retransmission value of the HARQ process is non-zero. In the step 740, it is checked whether or not the response is an ACK and a number of times that the data unit has been retransmitted is lower than the retransmission value. Only when both of above conditions are met, the flow goes to step 750, in which the HARQ process repeatedly performs the retransmission of the data unit until the number of times that the data unit has been retransmitted reaches the non-zero retransmission value. If one of the above conditions is not met, the flow goes to step 730, the HARQ process is configured to act in response to the type of the received response.

Figure 9:
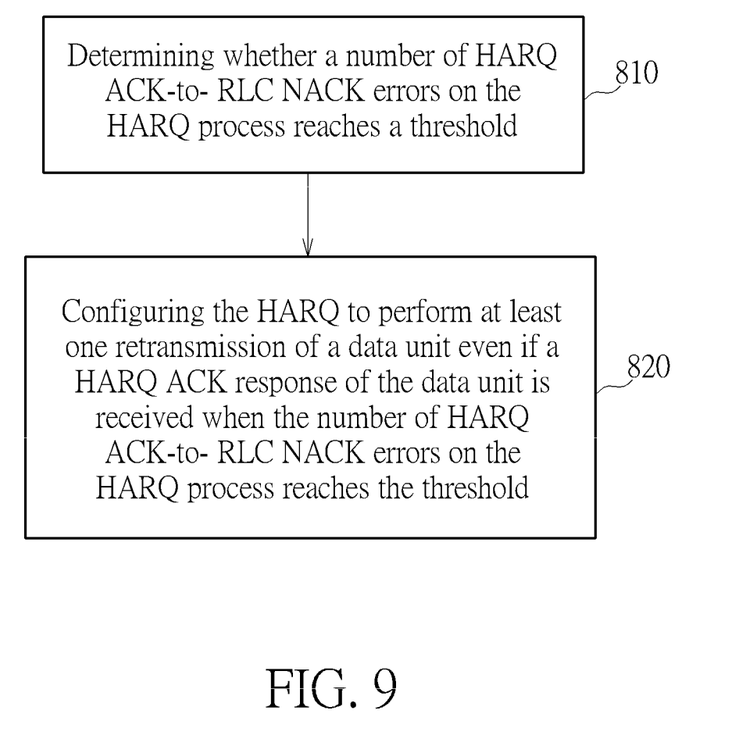
FIG. 9 is a simplified flow chart of the monitoring process II and the handling process II of a method according to one exemplary embodiment of the present invention.

The monitor process II and the handling process II of the method of addressing the HACK ACK-to-RLC NACK errors problem can be summarized as a simplified flow chart depicted in FIG. 9. In step 810, it is determined whether a number of HARQ ACK-to-RLC NACK errors on the HARQ process reaches a threshold. Then, the flow goes to step 820, configuring the HARQ process to perform at least one retransmission of a data unit even if a HARQ ACK of the data unit is received when the number of the HARQ ACK-to-the RLC NACK errors on the HARQ process reaches the threshold. As principles and operations of the method of FIG. 9 can be appreciated by the above embodiments, detailed descriptions of the method of FIG. 9 are omitted here for the sake of brevity.

Figure 10:
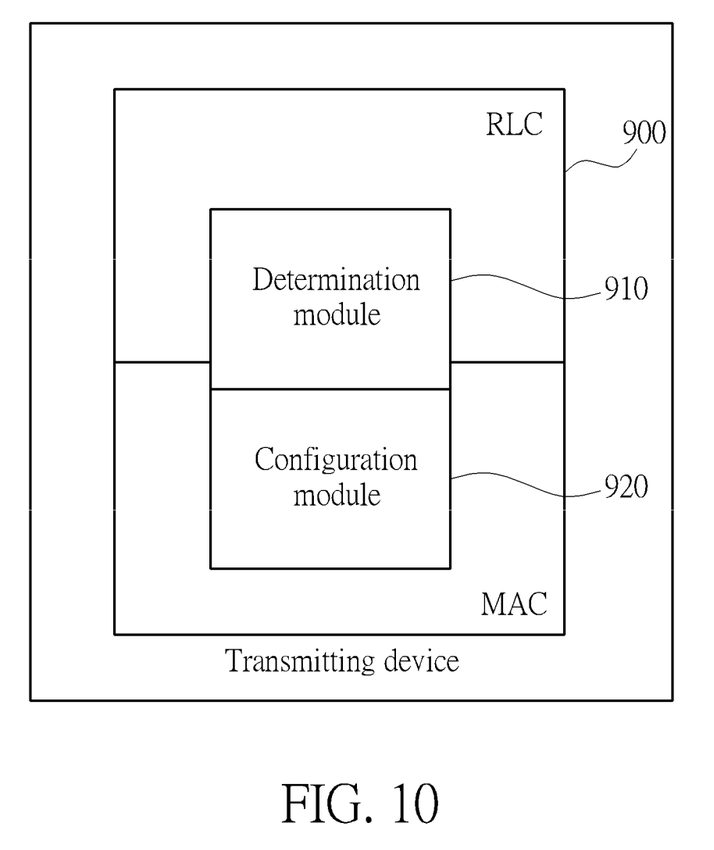
FIG. 10 is a functional block diagram of a controller implementing the method of FIG. 9 according to one exemplary embodiment of the present invention.

According to one embodiment of the present invention, a controller for implementing the above-mentioned method of addressing the HARQ ACK-to-RLC NACK errors problem is provided. FIG. 10 illustrates a block diagram of the controller. As illustrated, the controller 900 is located both in a MAC layer and a RLC layer of a transmitting device for managing the HARQ processes included in the MAC layer. The controller 900 includes a determination module 910 and a configuration module 920. The determination module 910 determines whether a number of HARQ ACK-to-RLC NACK errors on the HARQ process at the transmitting device reaches a threshold. The determination module 910 needs to collect HARQ responses received at the MAC layer at the transmitting device as well as RLC responses received at the RLC layer at the transmitting device. The configuration module 920 is configuring the HARQ process to perform at least one retransmission of a data unit even if a HARQ ACK of the data unit is received when the number of the HARQ ACK-to-the RLC NACK errors on the HARQ process reaches the threshold. As principles and operations of the controller of FIG. 10 can be appreciated by the above embodiments, detailed descriptions of the controller of FIG. 10 are omitted here for the sake of brevity.

Those of skill in the art will appreciate that the various illustrative logical blocks, modules, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Therefore, the methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored. If implemented in firmware and/or software, the functions may be stored as one or more instructions or code on a computer-readable medium. Examples include computer-readable media encoded with a data structure and computer-readable media encoded with a computer program. Non-transitory computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In conclusion, the transmission failure regarding HARQ transmission are addressed respectively by the monitoring process I and the handling process I as well as the monitoring process II and the handling process II. As a result, the present invention effectively improves the performance of the wireless communications system by modifying retransmission mechanism of the HARQ scheme.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of managing at least one Hybrid Automatic Repeat reQuest (HARQ) process in a wireless communications system, comprising;
    determining a priority of the HARQ process according to a transmission success rate of the HARQ process;
    determining a priority of a data unit to be transmitted; and
    utilizing a transmitter to transmit the data unit according to the priority of the data unit and the priority of the HARQ process.

2. The method of claim 1, wherein the priority of the data unit is selected from a group consisting of at least a first data priority and a second data priority lower than the first data priority, the priority of the HARQ process is selected from at least a group consisting of a first HARQ priority and a second HARQ priority lower than the first HARQ priority.

3. The method of claim 2, wherein the step of transmitting the data unit according to the priority of the data unit and the priority of the HARQ process comprises:
   transmitting the data unit having the first data priority via the HARQ process having the first HARQ priority.

4. The method of claim 2, wherein step of transmitting the data unit according to the priority of the data unit and the priority of the HARQ process comprises:
   transmitting the data unit having the second data priority via the HARQ process the second HARQ priority.

5. The method of claim 2, wherein the step of transmitting the data unit according to the priority of the data unit and the priority of the HARQ process comprises:
   transmitting the data unit having the second data priority via the HARQ process having the first HARQ priority when there is no other data unit having the first data priority waiting to be transmitted.

6. The method of claim 2, further comprising:
   transmitting dummy data unit via the HARQ process having the second HARQ priority when there is no other data unit waiting to be transmitted.

7. The method of claim 2, wherein and the step of transmitting the data unit according to the priority of the data and the priority of the HARQ process comprises:
   transmitting the data unit having the first data priority via the HARQ process having the second HARQ priority when an amount of data units having the first data priority waiting to be transmitted reaches an upper limit.

8. The method of claim 2, wherein the step of determining the priority of the data unit comprises:
   determining the data unit as having the first data priority when the data unit corresponds to retransmission data or control data.

9. The method of claim 2, further comprising:
   after the priority of the HARQ process is determined based on the transmission success rate,
   counting a period of reset time; and
   when the period of reset time expires and the priority of the HARQ process is a second HARQ priority, resetting the priority of the HARQ process to a first HARQ priority.

10. The method of claim 1, wherein the step of determining the priority of the HARQ process comprises:
    determining an average transmission success rate according to a plurality of transmission success rates of a plurality of HARQ processes including the HARQ process; and
    determining the priority of the HARQ process according to the transmission success rate and the average transmission success rate.

11. The method of claim 10, wherein the step of determining the priority of the HARQ process according to the transmission success rate and the average transmission success rate comprises:
    checking if a difference between the transmission success rate and the average transmission success rate exceeds a threshold; and
    when the difference exceeds the threshold, determining the priority of the HARQ process based on the transmission success rate.

12. The method of claim 11, wherein the step of determining the priority of the HARQ process based on the transmission success rate comprises:
    determining the HARQ process having the first HARQ priority when the transmission success rate of the HARQ process is greater than the average transmission success rate; and
    determining the HARQ process having the second HARQ priority when the transmission success rate of the HARQ process is lower than the average transmission success rate.

13. The method of claim 10, wherein the step of determining the priority of the HARQ process according to the transmission success rate and the average transmission success rate comprises:
    when none of differences, each between one of the transmission success rates and the average transmission success rate, exceeds a threshold, determining each of the HARQ processes as having a same HARQ priority.

14. The method of claim 1, wherein the step of determining the priority of the HARQ process comprises:
    counting a period of time; and
    determining the transmission success rate of the HARQ process according to numbers of HARQ negative acknowledgements (NACK) responses and HARQ acknowledgements (ACK) responses regarding the HARQ process that have been received during the period of time.

15. A controller to manage at least one Hybrid Automatic Repeat reQuest (HARQ) process in a wireless communications system, comprising;
    a first determination circuit, arranged to determine a priority of the HARQ process according to a transmission success rate of the HARQ process;
    a second determination circuit, arranged to determine a priority of a data unit to be transmitted; and
    a configuration circuit, coupled to the first determination circuit and the second determination circuit, arranged to transmit the data unit according to the priority of the data unit and the priority of the HARQ process.

16. A non-transitory computer readable medium including computer readable instructions that cause a computer to execute the steps of:
    determining a priority of the HARQ process according to a transmission success rate of the HARQ process;
    determining a priority of a data unit to be transmitted; and
    transmitting the data unit according to the priority of the data unit and the priority of the HARQ process.

* * * * *